US005418529A

United States Patent [19]

De Luigi et al.

[11] Patent Number: 5,418,529

[45] Date of Patent: May 23, 1995

[54] SELECTIVE CALL RECEIVER WITH AN INTELLIGENT MEMORY SYSTEM

[75] Inventors: Bruno De Luigi, Buttwil; Ulrich Maas, Gerolfingen, both of Switzerland

[73] Assignee: Eta SA Fabriques d'Ebauches, Grenchen, Switzerland

[21] Appl. No.: 62,254

[22] Filed: May 17, 1993

[30] Foreign Application Priority Data

May 27, 1992 [CH] Switzerland ........................ 01717/92

[51] Int. Cl.[6] ................................................ H04Q 7/00

[52] U.S. Cl. .......................... 340/825.44; 340/825.48; 379/88

[58] Field of Search ....................... 340/825.44, 825.48; 379/88, 67

[56] References Cited

U.S. PATENT DOCUMENTS

| | | | |
|---|---|---|---|
| 4,422,071 | 12/1983 | de Graff | 340/825.44 |
| 4,786,902 | 11/1988 | Davis et al. | 340/825.44 |
| 4,835,777 | 5/1989 | De Luca et al. | 340/825.44 |
| 4,839,628 | 1/1989 | Davis et al. | 340/825.44 |
| 4,910,510 | 3/1990 | Davis et al. | 340/825.44 |
| 5,012,234 | 4/1991 | DuLaney et al. | 340/825.44 |
| 5,134,711 | 7/1992 | Asthana et al. | 364/232.2 |
| 5,177,477 | 1/1993 | Fennell et al. | 340/825.44 |
| 5,182,553 | 1/1993 | Kung | 340/825.44 |
| 5,225,826 | 7/1993 | De Luca et al. | 340/825.44 |
| 5,258,751 | 11/1993 | De Luca et al. | 340/825.44 |

FOREIGN PATENT DOCUMENTS

| | | | |
|---|---|---|---|
| 0232123 | 8/1987 | European Pat. Off. | G08B 3/10 |
| 0341905 | 11/1989 | European Pat. Off. | G06F 9/46 |
| 0413369 | 2/1991 | European Pat. Off. | G08B 3/10 |

OTHER PUBLICATIONS

Watch Pager, 1990, Motorola Brochure, Motorola Paging Division 1500 NW 22 Ave Boyton Bch, Fla. 33426-8292.

*Primary Examiner*—Donald J. Yusko
*Assistant Examiner*—Edward Merz
*Attorney, Agent, or Firm*—Griffin, Butler Whisenhunt & Kurtossy

[57] ABSTRACT

A pager receiver for receiving radio broadcast message signals including call signal information and message information comprises a receiver (3) for receiving and demodulating coded message signals, a memory (5) for memorizing the message information, a coded message signal decoder (4) for selectively furnishing message information to the memory (5) and function control circuitry (8) capable of furnishing control signals to the memory and of receiving therefrom message information stored therein. The memory (5) comprises internal processing circuitry for controlling the reception of message information coming from the decoder (4) so that the selected message information furnished by the decoder (4) may be stored in the memory without the necessity of having control available from a micro-computer or processor outside such memory which thus becomes, in a manner of speaking, "intelligent". The receiver may be applied to pagers incorporated in wrist-watches.

12 Claims, 5 Drawing Sheets

SELECTIVE CALL RECEIVER WITH AN INTELLIGENT MEMORY SYSTEM

FIELD OF THE INVENTION

The present invention concerns local call systems and, more specifically, the memorization and manipulation of message information received by a local call receiver. In what follows in the present description such local call receivers will be designated by the word "pager" this term now being very largely admitted and employed as much by specialists as by the public which makes use of such receivers.

The present invention may be used in portable pagers adapted to receive message signals broadcast at high frequency, the invention being described hereinafter in relationship with this example of application to which, however, it is not limited.

BACKGROUND OF THE INVENTION

Telecommunication systems in general and pager systems more specifically using radio broadcast message signals are presently largely employed so as to assure calling of pagers with the purpose of sending them information selectively from a central station. Such information is transmitted by means of coding schemes and predetermined message formats, such as those known under the terms POCSAG or GOLAY. In respect of the scheme POCSAG, reference may be had to the recommendation of the CCIR 584-1, Dubrovnik, 1986.

The predominant transmission coding schemes used for calling pagers have evolved from simple systems based on sequential acoustic signals towards formats based on code words made up of numerous bits and the functions offered to the user have changed in a corresponding manner from a simple acoustic warning signal to a complex multifunctional alert requiring reading of numeric or alphanumeric data on a display.

To obtain such multifunctional possibilities, pager systems and present pager-receivers include microprocessors or even microcomputers enabling them to react to information containing a large variety of coded radio-broadcast message signals. To this end known pagers are capable of receiving such signals, demodulating them, extracting therefrom dedicated call signal information and message information as such, memorizing such information and finally displaying certain selected elements of the message as transmitted.

Prior art pagers also permit the user to have at his disposition special functional possibilities such as the later repetition of messages already received and the display of the number of messages received or the time of day.

The microcomputers employed in known pagers are designed to control the operation of the receiver in order that the latter may receive radio-broadcast message signals and in order to accomplish the decoding functions of the coded message signals, memorization of given message signals, control of the display and manipulation of stored message signals in order that the various user controllable functions may be performed.

One of the major requirements of a pager is that it must handle information received in real time, otherwise there will be a risk of loss of information, for example by reason of the fact that the decoding speed is too low relative to that at which the information is received. Consequently, the operations performed by the microcomputer relative to reception, decoding, memorization and manipulation of received coded message information must be sufficiently rapid in order that the results obtained are useful for controlling the arrangement without risking loss of information. One thus must use particularly high performance microcomputers operating at a high speed.

The clock frequency necessary to attain the high operational speeds in real time can be for instance 500 kHz. Such high clock frequencies increase the feed voltage and energy consumed by the pager whilst rendering it more expensive. At the present the battery necessary for energizing current microcomputers determines to a large extent the cost, dimensions and the weight of pagers.

Additionally, such high clock frequencies and the signals which they induce in the circuits of the pager at harmonic frequencies of the clock frequency seriously disturb the processing quality which is to be expected in a good pager. Furthermore, the high consumption of energy and the physical limits of such microcomputers also bring about a limitation of functions which can be performed and offered in existing pagers.

It is also current practice to repeat two or three times the diffusion of message signals in order to guarantee that the pager for which such signals are intended receives them correctly. Known pagers thus include memory space the dimensions of which must be compatible with memorization not only of the original message signals, but also of their repetitions. The additional memory capacity which is necessitated by such repetitions increases still further the energy consumption and the cost of known pagers.

The purpose of the invention consists in providing a pager which limits or even eliminates the disadvantages of prior art pagers.

SUMMARY OF THE INVENTION

The invention thus has as its objective a pager intended to receive radio-broadcast message signals comprising call signal information and message information, said message information comprising one or several messages, said pager comprising a receiver intended to receive and to demodulate coded message signals, a memory arrangement for storing said message information, a decoder intended to decode such coded message signals and for selectively furnishing said message information to said memory arrangement, function control means capable of furnishing control signals to said memory arrangement and receiving therefrom message information which is stored therein, said pager being characterized in that said memory arrangement comprises internal processing means in order to control the reception of message information coming from said decoder.

Thus, the selected message information furnished by the decoder may be memorized by the memory arrangement without it being necessary to have instructions available from a microcomputer or a microprocessor outside such memory, this latter becoming thus in a manner of speaking "intelligent".

As a result, the selected message information may be directly memorized in real time in the intelligent memory arrangement which enables the microcomputer or microprocessor external to said memory means to accomplish other pager functions without the clock frequencies or processing speed being as high as in known pagers.

According to another characteristic of the invention, the pager may also be adapted in order to assure manipulation of stored message information in the memory arrangement so that deletion, copying and shifting of information thus memorized may be brought about within the memory arrangement, removing thus the limits imposed by such operation to the function control means, otherwise referred to as the pager microcomputer.

According to a still further characteristic of the invention, the pager may also be made capable of comparing message information received by the memory arrangement with previously stored information. In this manner, it is sufficient to memorize only the message information which differs from the message information previously stored, this reducing the required storage capacity.

Other characteristics and advantages of the invention will appear in the course of the following description which is given solely by way of example and drawn up with reference to the attached drawings.

DESCRIPTION OF THE PREFERRED EMBODIMENT

Figure 1:
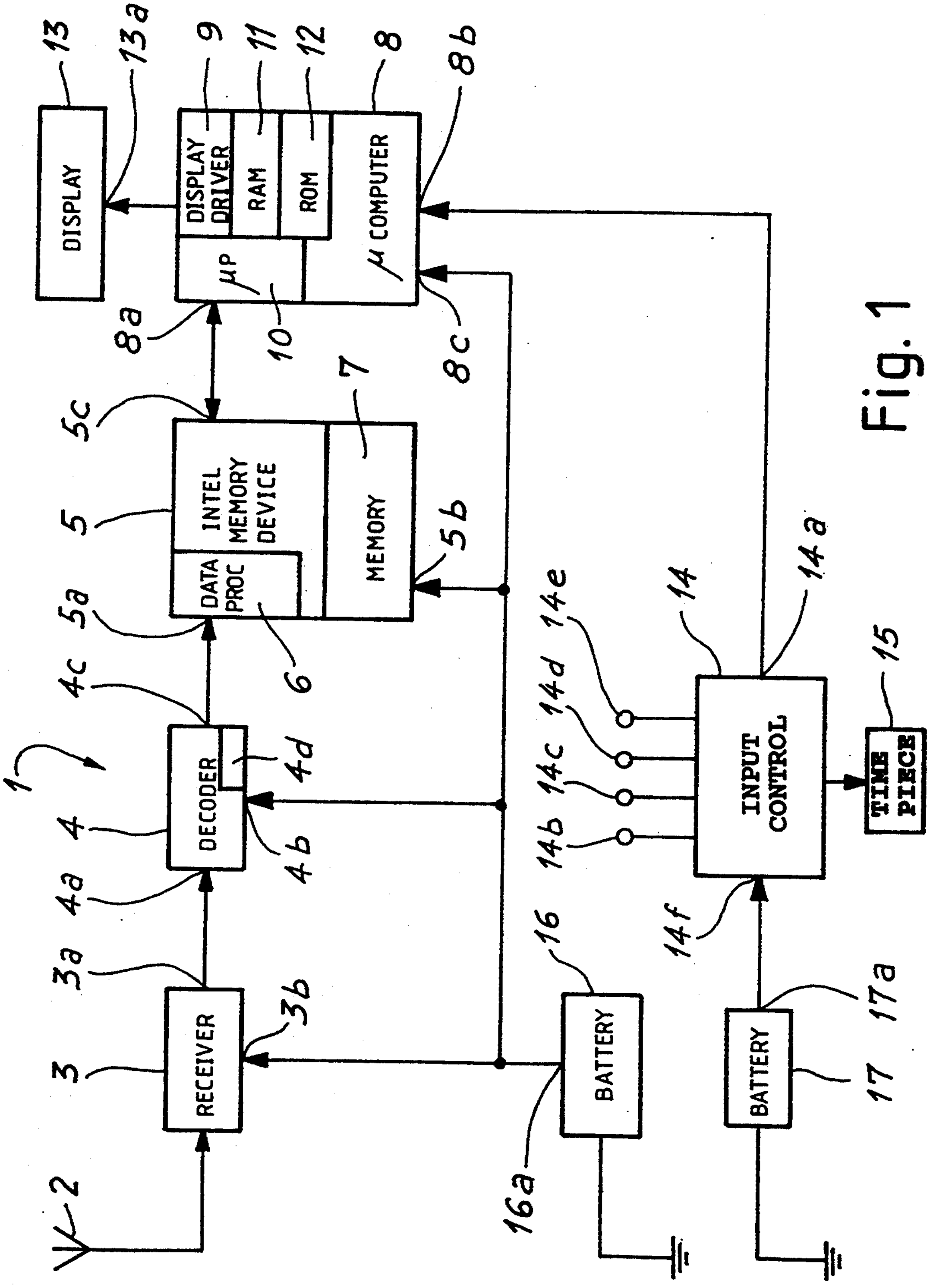
FIG. 1 is a simplified schematic of an embodiment of a pager in accordance with the invention.

Referring now to FIG. 1 of the drawings, there is shown a simplified functional block diagram of pager 1 constructed in accordance with the present invention. The pager 1 comprises an antenna 2, and a receiver 3 connected to the antenna 2, for receiving transmitted coded message signals from a central station or other source from which it is desired to call the user of the pager 1. The transmitted coded message signals may contain selective call signalling information, identifying a particular one of several pagers of the type shown in FIG. 1, and chosen message information, and may be in the POCSAG or other suitable coding scheme format. The transmitted coded message signals detected at the antenna 2 are demodulated by the receiver 3 and a serial stream of binary data representing these coded message signals is provided at an output 3*a* of the receiver 3.

The pager 1 also comprises a decoder 4 connected to the output 3*a* of the receiver 3 at its input 4*a*. The decoder 4 contains a memory area 4*d* for storing certain predetermined address information to which the pager 1 will respond. The decoder 4 is adapted so that a comparison is made between the coded message signals received at its input 4*a* and the predetermined address information stored in the memory area 4*d*. If the selective call signalling information matches one of the stored addresses, the decoder provides the message information associated with the coded message signals at its output 4*c*.

The pager 1 further comprises an intelligent memory device 5 connected to the output 4*c* of the decoder 4 at its input 5*a*. The intelligent memory device 5 includes a data processing unit 6 and a memory area 7. The intelligent memory device 5 is adapted to receive the selected message signals provided at its input 5*a* and store these message signals in the memory area 7. The data processing unit 6 is adapted to control the manner in which these message signals are stored in and retrieved from the memory area 7, and perform associated manipulations of the message signals, addresses, stack pointers and other internal variables. The detailed functioning of the intelligent memory device 5 will be explained later.

The pager 1 additionally comprises a microcomputer 8 connected to the output 5*c* of the intelligent memory 5 at its input 8*a*. The microcomputer 8 includes in a known manner a display interface 9, a microprocessor 10, a random-access memory (RAM) area 11 and a read-only-memory (ROM) area 12. The display interface 9 is adapted to display chosen message information by driving a display 13 via an input 13*a*, and includes a serial driver circuit and serial multiplexed liquid crystal (LCD) driver circuits. The display 13 comprises an LCD display suitable for displaying the message information stored in the memory area 7 of the intelligent memory 5, and may also be adapted to display time or other information.

The ROM area 12 contains firmware for controlling the operation of the microprocessor 10, such as programs for the display of the indicia corresponding to the message information stored in the memory area 7, for controlling the input and output functions of the microcomputer 8, for providing command signals to the intelligent memory 5 and the decoder 4, and for controlling the basic system timing of the microcomputer 8. The RAM area 11 is used for temporary data storage within the microcomputer 8, and amongst other functions provides a data buffer for message information provided from the intelligent memory 5 which is to be displayed.

The pager 1 further comprises an input control circuit 14 for providing data, at an output 14*a* to an input 8*b* of the microcomputer 8, indicative of input information provided by a user. User inputs 14*b, c, d* and *e* are connected to the input control circuit 14 and may be in the form of pushbuttons, rotatable buttons or other actuable members in order that a user can control some of the operations of the pager 1. The input control circuit 14 may also be adapted to control other devices associated with the pager 1. For example a timepiece may be combined with the pager 1 and the user inputs 14*b, c, d* and *e* may be used to provide user control of some of the functions of the timepiece. In addition, the input control circuit 14 may directly control the operation of some of the functions of the timepiece associated with the pager 1, such as providing current to energise the motor 15 of an electronic watch movement. It is to be noted that the pager thus combined with a timepiece may take the form of a wrist-watch.

A portable power supply 16, which may be a battery, is also provided in the pager 1 for supplying power to the input 3*b* of the receiver 3, the input 4*b* of the decoder 4, the input 5*b* of the intelligent memory 5 and the input 8*c* of the microcomputer 8, from its output 16*a*. Another portable power supply 17 having an output 17*a* is provided to supply the input control circuit 14 with power at its input 14*f*. This arrangement advantageously supplies power from separate sources to the pager 1 and any associated devices, such as a timepiece, so that in the event that, for example, the battery supplying the pager becomes discharged, the timepiece may continue to function. It is to be appreciated however that both the pager 1 and any associated devices may be supplied from a single power source.

Figure 2:
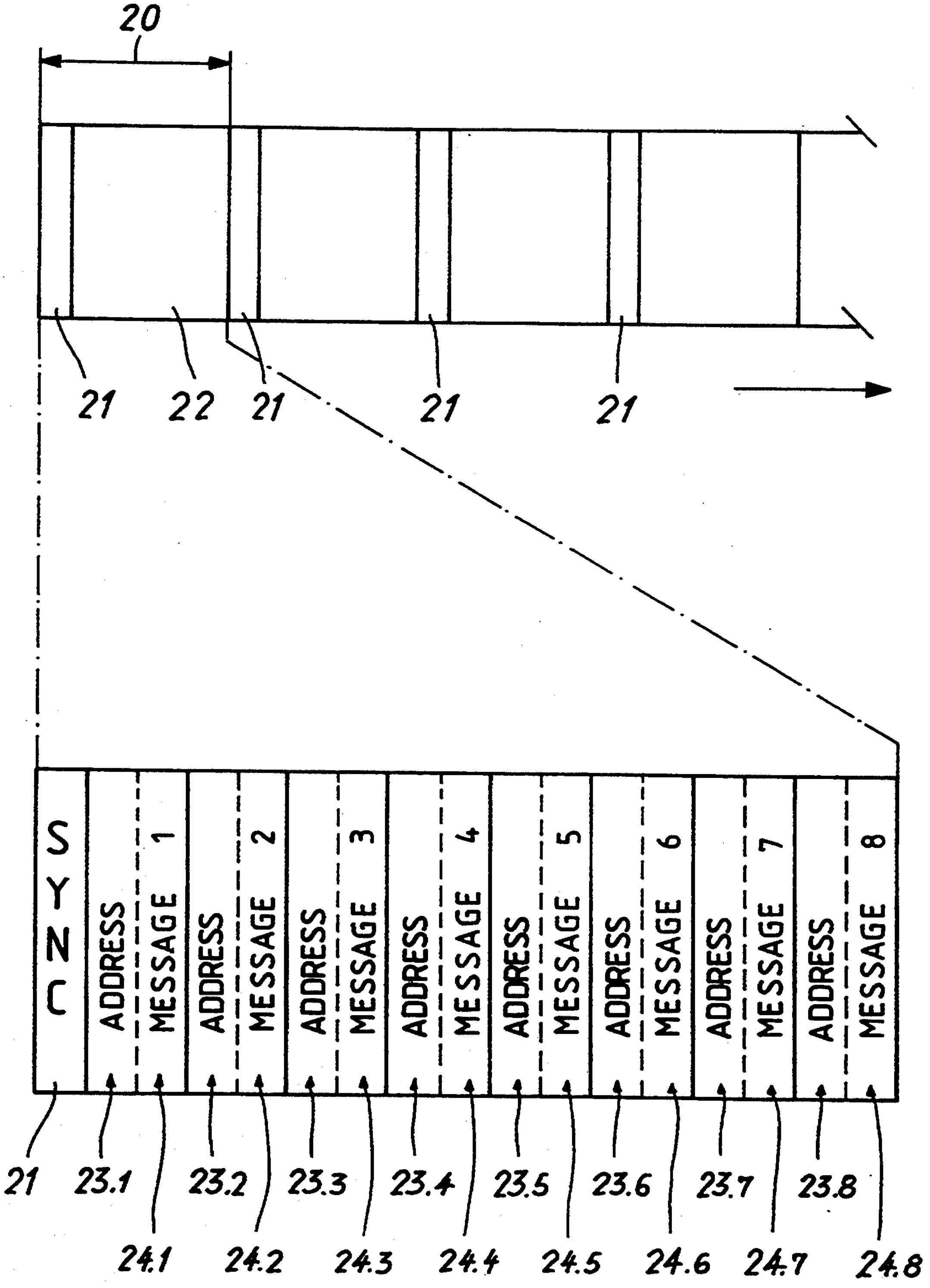
FIG. 2 is a diagram representing the POCSAG coding scheme which is used to transmit message information intended for the pager of FIG. 1.

An example of the message information and pager coding scheme used for transmitting message signals such as those used by pager 1 is shown in FIG. 2. The system POCSAG, well known to specialists in the art, uses a digital coding format made up from groups of code words 20, themselves each made up of a synchronization word 21 and a group 22 of eight frames each consisting of two code words, such groups of code words being transmitted in a serial format at regular intervals. Each group 22 of eight frames is transmitted following a synchronization word 21, the eight distinct frames being adapted to contain address information and message information. For purposes of explanation the lower portion shows in detail a single group of code words 20. Each frame including an address-code word, 23.1 to 23.8 respectively, and a message code word 24.1 to 24.8 respectively.

Thus, in the example shown in FIG. 2, each pager of a group formed of pagers in conformity with that shown in FIG. 1, must operate on one of the eight address-code words in a manner such that each of such words represents the call signalling information with the help of which each pager of the group is respectively identified.

Figure 3:
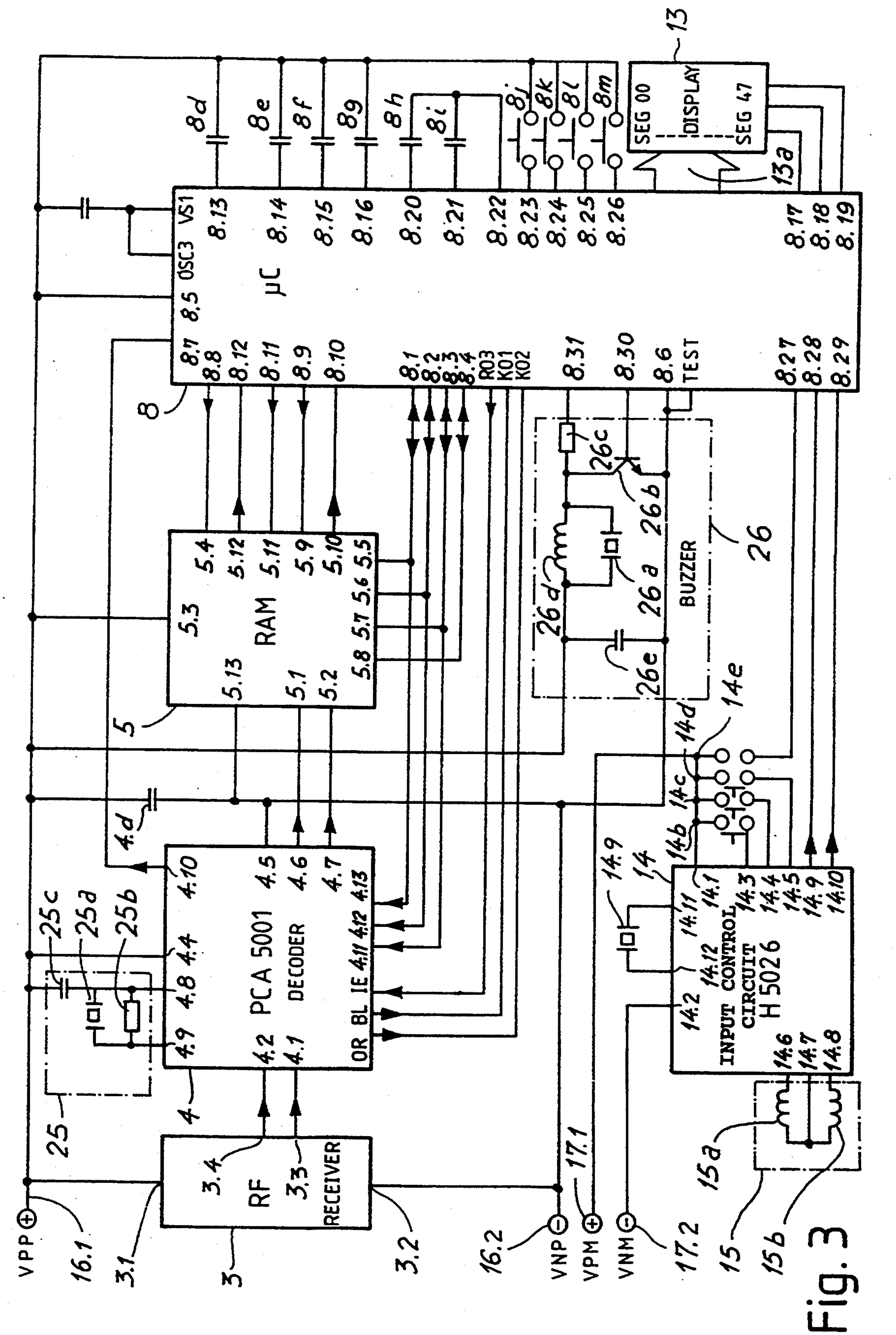
FIG. 3 is a more detailed schematic of the pager according to the invention.

The invention will be better understood in referring to FIG. 3 which shows a more detailed schematic of a preferred embodiment of pager 1 according to the invention. As already described hereinabove, pager 1 basically comprises an antenna (not shown on FIG. 3), receiver 3, decoder 4, intelligent memory 5 and microcomputer 8. The circuit 14 for control inputs intended for controlling a timepiece 15 associated with the pager is also shown on FIG. 3.

Receiver 3 is connected by terminal 3.1 to a positive supply line 16.1 of the portable power supply 16 (not shown on FIG. 3), its negative terminal 3.2 being connected to a negative supply line 16.2 of the power supply 16. In a known manner, radio broadcast coded message signals are captured and demodulated by receiver 3 and the antenna to which the latter is connected so that groups of binary data such as those shown in FIG. 2 are generated at the output 3.3 of receiver 3 and transmitted to the input 4.1 of decoder 4. Receiver 3 includes in its internal circuitry an assembly (not shown on the figures but known per se) for checking the voltage of the energy source 16, such assembly providing a signal indicating low voltage of such source on output 3.4 of receiver 3. The output 3.4 transmits in such case the low voltage indication signal to other circuits of pager I in order that a display readable by the user may be assured on the display 13.

Decoder 4 is connected to the positive supply line 16.1 by its terminal 4.4 and to the negative supply line 16.2 by its terminal 4.5. A voltage stabilization capacitor 4*d* is connected between terminals 4.4 and 4.5. The decoder may be of the type PCA 5001 manufactured by Philips and its task is to separate the selective call signal information from the message information as such in the coded message signals and to compare the call signal information with the predetermined address information stored in the decoder and individual to the pager under consideration.

If the collective call signal information corresponds to one of the stored addresses, every message code word following the address code considered up to the following address code word is transmitted in the form of serial data from the output 4.6 to the input 5.1 of the intelligent memory 5.

The output 4.7 from the decoder 4 furnishes a data transfer signal in order to permit reading by the intelligent memory 5 of data available at the output 4.6, such signal assuming a high level or a low level at the input 5.2 of memory 5. The message information furnished to output 4.6 is introduced into the storage area 7 of the intelligent memory 5 when a complete data byte has been transferred from receiver 3 to decoder 4.

A resonator circuit 25 is connected to the decoder 4 through inputs 4.8 and 4.9 of this latter. It comprises basically a quartz resonator 25*a* connected in parallel to a damping resistor 25*b* and to the inputs 4.8 and 4.9. The positive supply line 16.1 is connected to one of the quartz resonator terminals 25*a* through a resonance capacitor 25*c*. The resonator circuit 25 cooperates with the internal circuitry of decoder 4 in order to form an oscillator circuit which furnishes a periodic wave form of 32 kHz for example to decoder 4 in order to determine the rate of transmission of message signals from receiver 3 towards decoder 4. As is well understood, other clock frequencies may be used as a function of the transmission rate of message signals. The resonator circuit 25 is also used to furnish a clock signal to the microcomputer 8 and to the intelligent memory 5. Such clock signal is furnished to the microcomputer 8 via the output 4.10 of decoder 4. The values of the resistor 25*b* and of the capacitor 25*c* may respectively be 4.7M Ω and 10 pF.

Decoder 4 comprises a reprogrammable electrically erasable memory of the EEPROM type (not shown) in which are stored the system parameters of the decoder 4. Control signals can be sent from the microcomputer 8 towards the inputs 4.11, 4.12 and 4.13 in order to control the functions of the decoder 4. One of the functions of the decoder 4 which may be controlled is the rate of bit transmission between decoder 4 and the intelligent memory 5, such rate going as high as 5000 bits/second. In such case, the message information is stored in the circular buffer located in the intelligent memory 5 without undergoing any other processing (such as comparison between the last two messages which have just been stored).

The input 5.3 of intelligent memory 5 is connected to the positive power supply line 16.1 while the input 5.13 is coupled to the negative line 16.2. The time base for the intelligent memory 5 is determined by the clock signal furnished by output 8.8 of the microcomputer 8 to the input 5.4.

The intelligent memory 5 shows four terminals 5.5, 5.6, 5.7 and 5.8 respectively connected to corresponding terminals 8.1, 8.2, 8.3 and 8.4 of the microcomputer 8, which assures a simple parallel connection with this latter enabling the sending of control signals from the microcomputer 8 to the intelligent memory 5 and the sending back of message information stored in memory area 7 of intelligent memory 5 towards the microcomputer 8 in order that such message information can be displayed. Depending on the nature of the control signal which is transmitted terminals 5.5 to 5.8 may also control the intelligent memory 5 in order to furnish the microcomputer 8 with status information in respect of the reception of message information by memory 5.

Other control signals may control the latter in order that it manipulates message information which is stored therein as will subsequently appear herein. A data transfer input 5.11 for memory 5 is also provided in order to assure the simultaneous transfer of data towards terminals 5.5 to 5.8.

An input 5.9 determines whether inputs 5.5 to 5.8 carry data or introduce control signals into the intelligent memory 5. When a high level signal is present on input 5.9, the signals on inputs 5.5 to 5.8 are interpreted as being control signals coming from the microcomputer 8, while if a low level signal is present, the signals are interpreted as constituting data.

A terminal 5.10 of intelligent memory 5 enables informing the microcomputer 8 that the memory is ready to receive control signals. A high level logic signal on terminal 5.10 is interpreted by the microcomputer 8 as indicating that memory 5 is ready for a further communication with the microcomputer 8 while a low level logic signal is interpreted as signifying that memory 5 is still in the process either of accomplishing a manipulation on the data or another operation, or is transferring data to the microcomputer 8.

An output terminal 5.12 from memory 5 serves to provide an interrupt signal to the microcomputer 8 in order to indicate thereto its functional status in response to the received message information or to the control signals. A high level logic signal is sent to the microcomputer 8 if, for example, fresh or repeated message information is received or if an unknown, forbidden or unperformable function is required by the microcomputer. Such interrupt signal may thus be used in order to indicate to microcomputer 8 that a new operation is required, such as for instance to announce the arrival of fresh message information or the sending of a new instruction to the intelligent memory 5. A low level signal indicates that no new action is required by the microcomputer 8.

Such microcomputer 8 may be of a known type suitably programmed. It is connected to the positive supply line 16.1 by its input 8.5 and to the negative supply line by its input 8.6. An input 8.7 receives the clock pulse train from the output 4.10 of decoder 4. An output terminal 8.8 furnishes a clock signal to the input 5.4 of the intelligent memory 5.

Microcomputer 8 also comprises output terminals 8.9 and 8.11 in order to furnish control signals and to transfer data as described hereinabove respectively to inputs 5.9 and 5.11 of the intelligent memory 5, while input terminals 8.10 and 8.12 are provided in order to receive respectively the acceptance and interrupt signals of the intelligent memory 5 as described hereinabove.

A liquid crystal display 13 is connected to microcomputer 8. It comprises segments numbered from 00 to 47 which are connected to the display driver circuit (not shown on FIG. 3) of microcomputer 8 by a bus 13a such that each segment may individually be controlled and that the desired message information may be displayed by display 13. Specialists in the art will understand that various voltage values are necessary for the driver circuit in order to control the various segments of the display 13. Input terminals 8.13 to 8.16 are connected to the positive supply line 16.1 through capacitors **8*d* to 8*g* in order to provide these various voltages. Capacitors 8*d* to 8*g* may have respective values of 220, 100, 100 and 100 nF. Microcomputer 8 also comprises output terminals 8.17, 8.18 and 8.19 in order to furnish, in a known manner, control and time base signals to the display 13** coming from the driver circuit.

The input terminals 8.20, 8.21 and 8.22 are provided in order to stabilize and smoothe the internal voltage levels of the microcomputer 8. One of the terminals of a capacitor **8*h* is connected to the input 8.20 while one of the terminals of another capacitor 8*i* is connected to the input 8.21. The other terminals of capacitors 8*h* and 8*i* are connected together to terminal 8.22**.

The microcomputer 8 is also provided with user control inputs 8.23 to 8.26, each one of which is connected to the positive supply line 16.1 through switches **8*j*, 8*k*, 8*l* and 8*m* which may be actuated by the user. When this occurs, a high level logic signal is applied to the control inputs by the user, for instance when he wishes to put the pager 1 into or out of operation, render it silent, protect the message displayed by display 13 or delete a displayed message as will be explained hereinafter. It will be understood that various other user control functions may be provided in this manner and that a separate input is not necessary for each of such functions thus provided; for example one or several switches or pushbuttons can be actuated according to a special sequence in order to indicate to microcomputer 8** that a certain function is to be performed.

The circuit 14 for control inputs and the timepiece is connected to the positive supply line 17.1 from the portable energy source 17 (not shown on FIG. 3) by terminal 14.1 and to the negative supply line 17.2 from supply 17 by terminal 14.2.

Circuit 14 also comprises inputs 14.3. 14.4 and 14.5 which serve to form supplementary user inputs in order to enable the pager 1 to perform certain functions ordered by the user and also to control the operation of the timepiece 15 which is controlled by circuit 14. A special sequence of signals applied to inputs 14.3, 14.4 and 14.5 or signals initially sent to other inputs may be used in order to determine whether inputs 14.3, 14.4 and 14.5 control the operation of the pager or the timepiece 15. Inputs 14.3, 14.4 and 14.5 are respectively connected to one of the terminals of switches **14*b*, 14*c* and 14*d*, their other terminals being connected together at input 14.1. The switches may be provided under any form usable by the user. Another switch 14*e* is connected between the positive supply line 17.1 and an input 8.27 of the microcomputer 8** in order to indicate thereto whether it is the pager or the timepiece which is being controlled.

Circuit 14 further includes two outputs 14.6 and 14.8 respectively connected to one of the terminals of the two windings **15*a* and 15*b* of the timepiece 15. The other terminals of such windings are connected to a common return connection 14.7. Those skilled in the art will understand that in the example chosen herein windings 15*a* and 15*b* belong to a bidirectional motor of an analog quartz time-piece well known moreover, but that any other type of time-piece may be provided, including a digital timepiece in which case, as is well understood, a watch motor is not necessary. Various other inputs may be provided for circuit 14** in order to control any other function of the timepiece.

Two other outputs 14.9 and 14.10 of circuit 14 are respectively coupled to inputs 8.28 and 8.29 in order to furnish the microcomputer 8 with data representing the signals applied to inputs 14.3, 14.4 and 14.5. A quartz resonator 14.9 is coupled to input 14.11 and to output 14.12 of circuit 14 in order to constitute a timebase for the latter.

Pager 1 also comprises a warning device 26 coupled to the microcomputer 8 in order that new message information received by decoder 4 may be announced. An electrical acoustic transducer 26*a* (buzzer) is connected by one of its terminals to the collector of a switching transistor 26*b* and by its other terminal to the positive supply line 16.1. The collector of transistor 26*b* is also connected to the output 8.31 of the microcomputer 8 through a polarization resistor 26*c* which may have a value of 18 kΩ. Normally, this output is maintained at a high logic level. The emitter of transistor 26*b* is connected to the negative supply line 16.2 and to terminal 8.6 of the microcomputer 8. The base of transistor 26*b* is connected to the output 8.30 of the latter. A choke 26*d* having an inductance of 45 mH, for instance, is connected in parallel with the buzzer 26*a*. Finally, a voltage stabilizing capacitor 26*e* having a value of 4.7 μF, is connected between the positive 16.1 and negative 16.2 supply lines. In normal operation, the output 8.30 is maintained at a low level and transistor 26*b* is non-conducting.

When pager 1 is to announce reception of a call or the accomplishment of another function, a signal which can have a variable wave form is transmitted by output 8.31 which generates a voltage at the terminals of the buzzer 26*a* which thus will produce a first sound. A different sound may be produced by the transducer 26 when a signal is sent by the output 8.30 to the base of transistor 26*b* which then begins to conduct. A different voltage is then generated at the terminals of the buzzer 26*a* and a second sound is produced. Such different sounds can be used in order to announce performance of various functions by pager 1.

Figure 4:
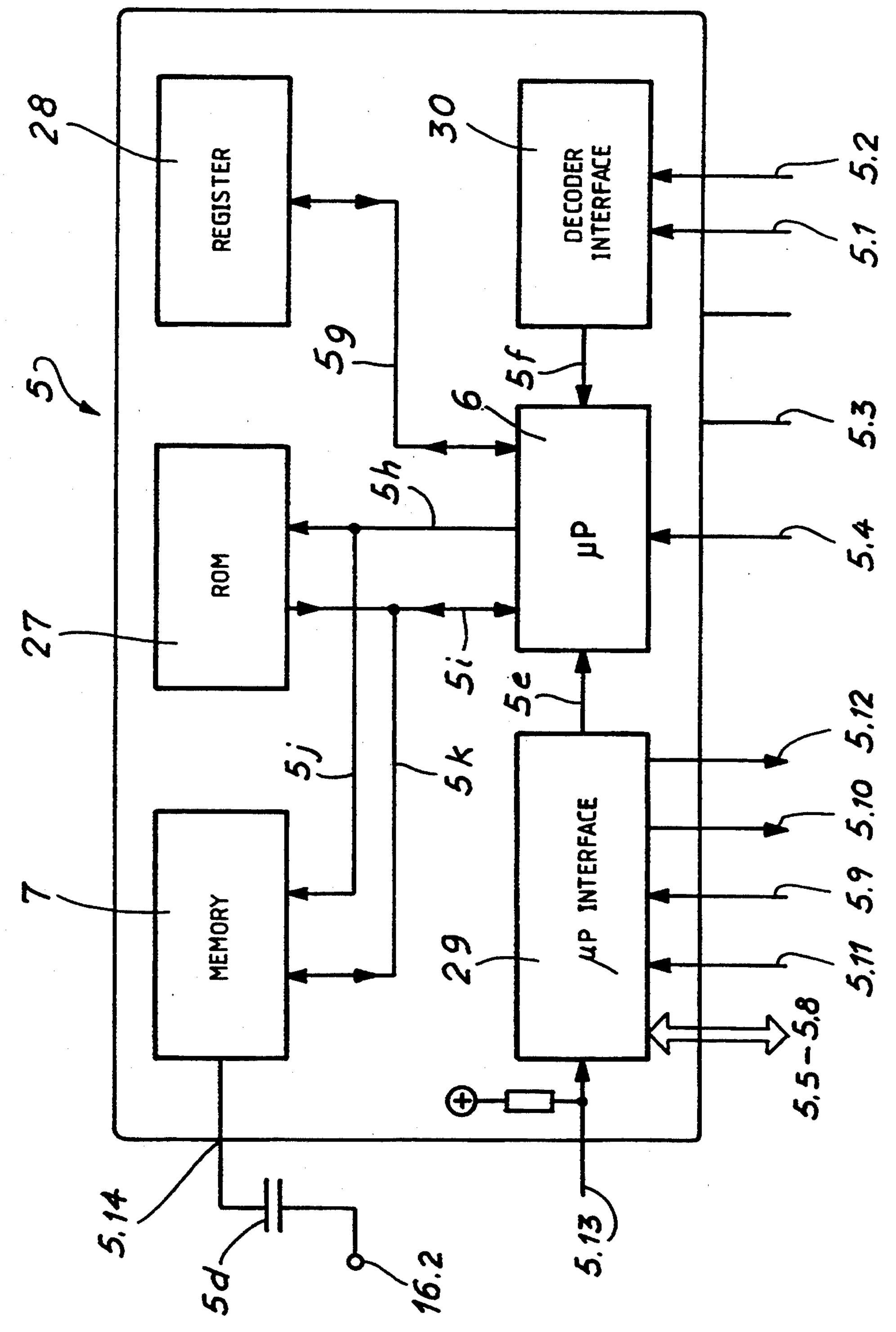
FIG. 4 is a simplified schematic of a memory arrangement used in the pager of FIG. 1 and FIG. 5 schematically shows a read-write memory (RAM) employed in the memory arrangement of FIG. 4.

FIG. 4 shows a simplified schematic of the intelligent memory 5 which basically comprises the unit 6 for data processing, memory area 7, ROM 27, register stack 28, the microprocessor interface 29 and the decoder interface 30. Terminals 5.5 to 5.12, already described, are connected to the microprocessor interface 29 while terminals 5.1 and 5.2, also hereinbefore described, are connected to the decoder interface 30. The input providing the clock signal of 32 kHz to the intelligent memory 5 is connected to the data processing unit 6. Furthermore, the microprocessor interface 29 comprises a test input 5.13, a capacitor 5*d* which may have a value of 15 nF being connected between the negative supply line 16.2 and an input 5.14 of memory area 7.

Intelligent memory 5 also comprises address and data buses 5*e* to 5*k* connected between the various internal elements of memory 5 in order to assure communication and data transfer among themselves. ROM 27 contains the programs necessary in order to bring about operation of memory 5. In the embodiment described herein, memory area 7 is a RAM having a capacity of 512 octets and intended to memorize the message signals coming from decoder 4 and the internal variables of the system, the stack of registers 28 forming on the one hand a memory for temporary storage of data used for manipulating message information in the memory area 7 and on the other hand the stack pointer and program counter.

It will be understood by those skilled in the art that calls are normally transmitted more than once from a central station to a given pager in order to guarantee good reception by such pager. Consequently, before writing message information from decoder 4 into the memory area 7, intelligent memory 5 may advantageously compare such received message information with two preceding messages which the pager has just received. If the new message information corresponds to one or the other of the two most recent messages, the new message is not written into memory area 7.

Figure 5:
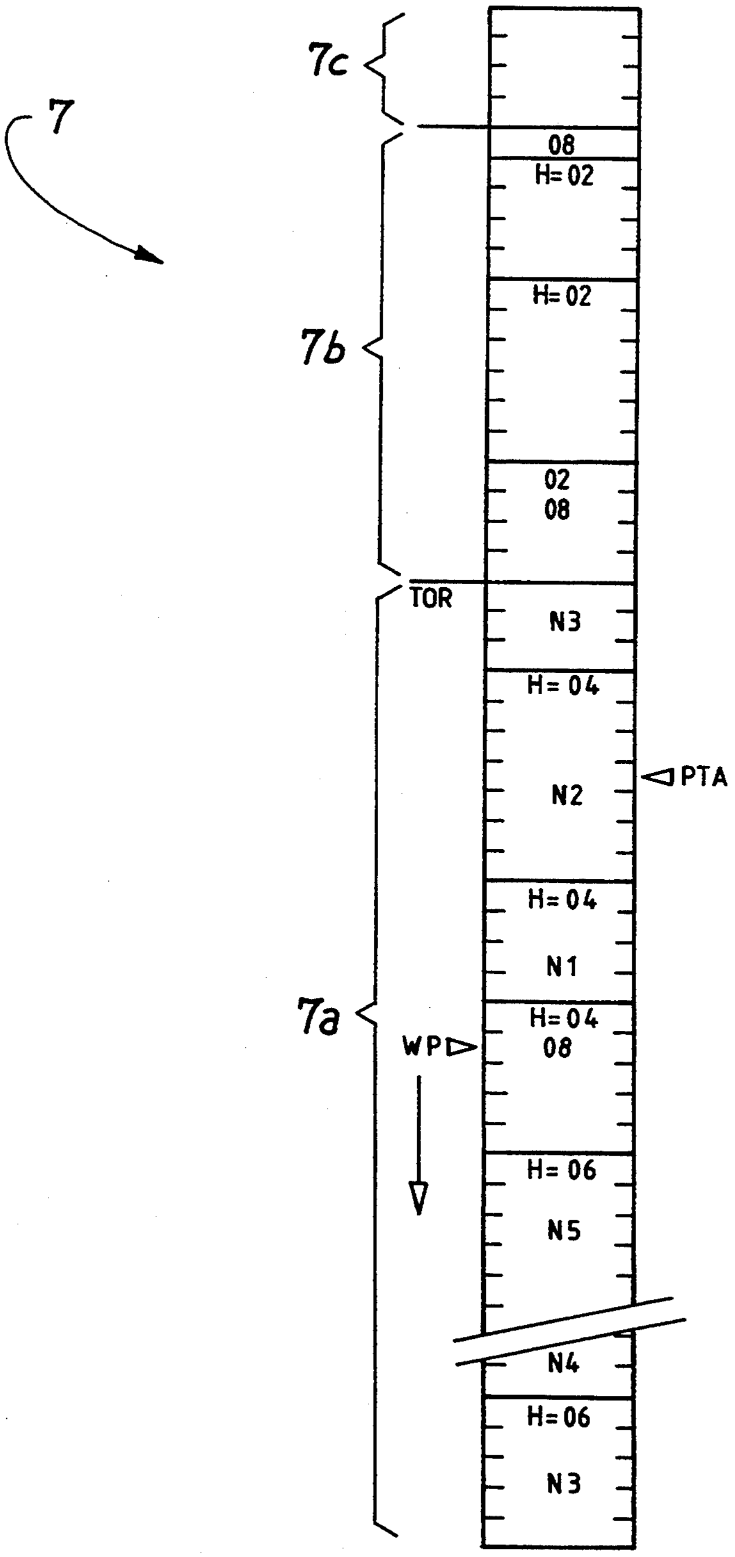

As already indicated and as shown on FIG. 5, it is envisaged, in the embodiment of the invention under consideration, to give the memory area 7 a capacity of 512 octets. Such a capacity is sufficient for conferring to pager 1 sufficient information manipulation possibilities so as to render it user friendly.

A capacity of 512 octets requires nine bits in order to permit addressing of octets 0 to 517 in memory area 7. This signifies that for each write-in or read-out operation in this memory area, two transfers each of eight bits are necessary since buses 5*e* to 5*k* have a transfer capacity limited to 8 bits at a time. The program stored in ROM 27 is adapted to work with such a double eight bit transfer of which in the present embodiment only nine bits are used. In fact, one may thus, without substantially changing the program contained in ROM 27, easily increase the capacity of memory area 7 up to a maximum of 65 kilo-octets, which is a value largely exceeding the capacity of 4 kilo-octets, which would already constitute a value giving a large degree of user comfort. Such an extension of the memory capacity would give the pager the possibility of carrying out more control functions by the user and also a greater capacity of storing received message information.

Memory area 7 comprises address segments 7*a*, 7*b* and 7*c* (FIG. 5), segments 7*a* and 7*b* of which comprise addresses 0 to 489 and are available for the storage of message information received from decoder 4 and segment 7*c* comprises addresses 490 to 511 and contains internal variables of intelligent memory 5.

Address segment 7*a* comprises addresses 0 to 300 and is used by the data processing unit 6 as a circular buffer in order to store message information coming from decoder 4 so that the memory location assigned to the circular buffer is initially sequentially filled with received message information. Following storage of the message information in each available address of the circular buffer, the oldest message information is transferred at the moment when the most recent message information is received by intelligent memory 5. By default address segment 7*b* occupying addresses 301 to 489 is used as a protection section in which is stored message information coming from the circular buffer which the user does not wish to have transferred.

Address segment c comprises the following addresses which are used by the data processing unit 6 in order to manipulate data found in the memory area 7:

| Address | Function |
|---|---|
| 510 | This memory location contains the address of the end of the last protected message in the protection segment 7b. |
| 508 | Starting address of the circular buffer 7a, or Top-Of-RAM (TOR). By altering the value stored at this memory location, it is possible to change the capacity of the circular buffer 7a. |
| 503 | This register contains a data value which sets the number of octets per second at which data is transferred from the decoder 4 to the intelligent memory 5 without treatment or interpretation. |
| 500 | Contains the address of the last octet read when the data processing unit |

-continued

| Address | Function |
|---|---|
| | 6 was performing the instruction "PFIN read decrement", as will be subsequently described. |
| 499 | The data stored at this address is used to determine which newly received message information will be compared with the previous two. This address is initialised with the data 01 Hex and may be transferred with the value 03 Hex when it is desired to make such a comparison with the two newest messages. |

In addition the following codes which may be stored in the memory area 7 are interpreted by the data processing unit 6 to have special meanings:

| Code | Meaning |
|---|---|
| 08 Hex | Start and end of the protection zone 7b. |
| 04 Hex, 84 Hex | Header for a newly received message. |
| 05 Hex, 85 Hex | Header for a message to be erased from the circular buffer 7a. |
| 06 Hex, 86 Hex | Header for a message that has been treated by the user of the paging device 1. |
| 02 Hex, 82 Hex | Header for a protected message that has been transferred from the circular buffer 7a to the protected zone 7b. |

Reference will now be had to the operation of the data processing unit 6, and the functions that are successively performed by the intelligent memory 5 when various instruction signals are received from the microcomputer 8. As described previously, the microcomputer 8 is able to indicate to the intelligent memory 5 that it wishes to send an instruction signal, by placing a high level logic signal at the output 8.9. When the output 5.10 is at a high logic level, an instruction signal placed at the outputs 8.1 to 8.4 is read by the intelligent memory 5 when a low-to-high logic transition occurs at the output 8.11. Under these conditions, the following functions may be performed by the intelligent memory 5, where each function code represents the logic state of the outputs 8.4 to 8.1 respectively:

| Code | Function |
|---|---|
| 0000 | The hardware of the memory storage area 7 is reset. This function is sent to the intelligent memory 5 on turn on of the pager device 1 . The size of the circular buffer is set at 300 bytes by default. The reset state of the chip must be maintained over at least two clock periods. |
| 0100 | The entire contents of RAM 7 are copied with "." or another uniform character without adjusting the circular buffer 7a. RAM is initialised as above, but without resetting of the size of the circular buffer 7a. This may be advantageous if a buffer size other than 300 octets is chosen by replacing TOR. |
| 1000 | The intelligent memory 5 uses outputs 5.5. to 5.8 as status flags to inform the microcomputer 8 as to the message information received from the decoder 4. The outputs 5.5. to 5.8 have the following signification:<br>5.5 Repetition of message 1<br>5.6 Repetition of message 2<br>5.7 New message<br>5.8 Error |
| 0001 | Writing stack pointer (PTA).- The RAM address containing the PTA is copied with new data sent to RAM 7 in 3 packets each of 4 bits. A change in the actual value of the PTA will only occur if all the packets of 4 bits are entered correctly. |
| 1001 | Reading stack pointer (PTA).- The stored value of the PTA is read by the data processing unit 6, in 3 consecutive packets each of 4 bits. |

The following functions serve to read from and write to the memory area 7. The actual address of the memory area 7 at which the message information is to be stored or read from must firstly be put into the PTA register. With a high logic level at the output 8.9 of the microcomputer 8, the data present at the inputs 5.5 to 5.8 are treated as instruction signals. The message information can subsequently be transferred to or from the intelligent memory 5 when the logic level at the output 8.9 again goes low.

When an entire octet (2 packets each of 4 bits) has been completely transferred, the position of the pointer PTA stays unchanged. It is therefore possible to copy an already read octet in the RAM 7 without the need to change the position of the PTA. It is only upon the transfer of the first packet of 4 bits, which are the four most significant data bits with the leading edge of the low-to-high logic level transition of the output 8.11 that the PTA will be incremented or decremented and the address changed of the RAM 7 to which it points.

| Code | Function |
|---|---|
| 1010 | RAM increment after reading - the contents of the address to which the PTA is pointing are read and then the PTA is automatically incremented. |
| 1011 | RAM decrement after reading - the contents of the address to which the PTA is pointing are read and then the PTA is automatically decremented. |
| 0010 | RAM increment after writing - data is transferred to the intelligent memory 5 and then written into the address to which PTA is pointing with an automatic increment. |
| 0011 | RAM decrement after writing - data is transferred to the intelligent memory 5 and then written into the address to which the PTA is pointing with an automatic decrement. |
| 1100 | PFIN decrement after reading - PFIN is a stack pointer which indicates the end of the circular buffer in the RAM 7. The instruction 1100 causes the contents of the memory having the address of PFIN to be read. After each octet is read, PFIN is automatically decremented, so that each octet is read once only. If PFIN has reached the last octet of message information, as indicated by a header 04 H or 84 H, the logic level of the output 5.12 goes high with an error indicated in the status word upon the reading of the least significant packet of 4 bits. It is therefore possible to read all the message information stored in the memory segment 7a up to the end of the circular buffer.<br>PFIN is initialised at the value of TOR. |

The following functions concern a single complete message, rather than separate octets of message information comprising the message. In order to separate the messages from one another, the code 04 H or 84 H is written with the data packet at the end of each message, and at the start of the following message (header). The PTA must contain the address of the header of the message to be manipulated by the data processing unit 6, so that the following instructions can be executed. If the PTA does not contain this address, an interrupt signal will be provided by a logic high level at the output 5.12 with an error included in the status word.

| Code | Function |
|---|---|
| 0101 | Change header - a message is marked as a treated message by changing the octet at the start of the message to 06 H or 86 H. This can advantageously avoid conflict between old message information and newly received message information. |
| 0110 | Message protection - a message can be protected against a writing fault by copying it into the protected area of address segment 7b. The message header in the circular buffer is firstly changed to 05 H or 85 H and then copied octet by octet into the protected area. After this the message is deleted from the circular buffer 7a automatically (no new code is needed). |
| 0111 | Message deletion - a message can be deleted from the circular buffer or the protected zone. A message is firstly marked for deletion by changing the header to 05 H or 85 H. It is then checked whether this message is needed to be compared with new messages received by the pager 1 for preventing the storage of a repeated message. When the message can be deleted all octets of that message will be erased. If deletion is not possible immediately, the message stays marked and when possible is erased (this however requires a further deletion command). |

As can be seen from the foregoing, the intelligent memory 5 according to the invention is thus adapted to receive message information from the decoder 4 in real time, so as to compare the received message with the previously received messages and store chosen message information in a memory area. The intelligent memory 5 is also adapted to copy, delete, move and otherwise manipulate the stored message information and to communicate and exchange data with the microcomputer 8 in a manner which frees the microcomputer 8 from some of the constraints connected with message information reception, storage and manipulation.

We claim:

1. A pager for receiving coded radio broadcast message signals comprising call signal information and message information comprising one or several messages, the pager comprising:

a receiver for receiving and demodulating said coded signals, a memory arrangement for storing said message information, a decoder for decoding said coded message signals and selectively furnishing said message information to said memory arrangement, and function control means for furnishing control signals to said memory arrangement and receiving therefrom stored message information, said memory arrangement comprising internal processing means for controlling the storing of said message information from said decoder, said internal processing means being arranged to control the storing of said message information directly from said decoder, independently of control signals coming from said function control means.

2. A pager as set forth in claim 1 wherein said internal processing means are also arranged to manipulate said message information stored in said memory arrangement.

3. A pager as set forth in claim 1 wherein said memory arrangement comprises memory locations forming a circular buffer in which said message information coming from the decoder is stored.

4. A pager as set forth in claim 3 wherein the number of memory locations within said circular buffer is adjustable.

5. A pager as set forth in claim 1 wherein said memory arrangement comprises a protection zone with memory locations intended for the protection of memory information which is stored therein in order to be protected against unauthorized replacement by subsequently received message information from said decoder, said internal processing means being furthermore adapted to write selected stored message information into said protection zone of said memory arrangement.

6. A pager as set forth in claim 5 wherein said internal processing means are further adapted to delete message information stored in said memory arrangement.

7. A pager as set forth in claim 3 wherein said internal processing means are further adapted to delete message information contained in said circular buffer.

8. A pager as set forth in claim 1 wherein said memory arrangement is arranged to receive said control signals from said function control means and to furnish message information thereto and wherein said function control means comprise, to such effect, a parallel input/output.

9. A pager as set forth in claim 8 wherein said parallel input/output is adapted to transfer four data bits at a time.

10. A pager as set forth in claim 1 further comprising at least one input adapted for actuation by a user by the rotation of a rotatable button in order to control the operation thereof and a timepiece housed in the pager, said user actuable input being also adapted to control operation of said timepiece.

11. A pager as set forth in claim 10 which assumes the form of a wristwatch.

12. A pager as set forth in claim 6 wherein said internal processing means are further adapted to delete message information contained in said protection zone.

* * * * *